April 8, 1924.  1,489,480
A. R. BROCKSMITH
BUMPER AND FENDER BRACE CONSTRUCTION
Filed Aug. 22, 1923
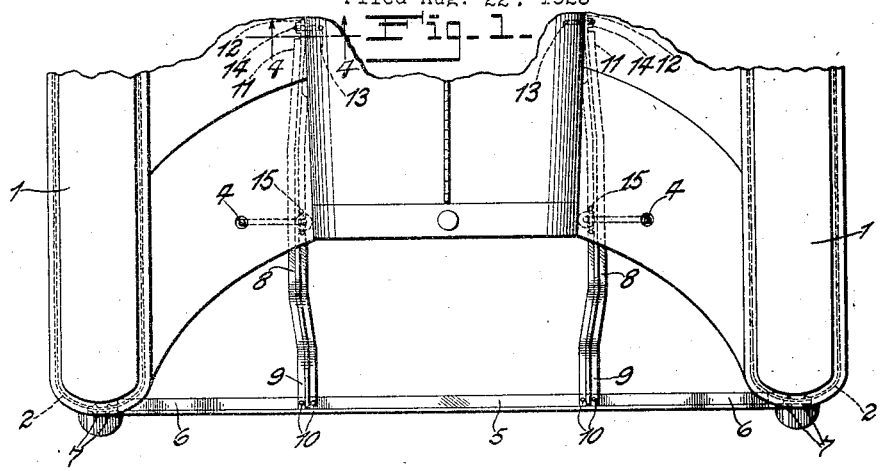
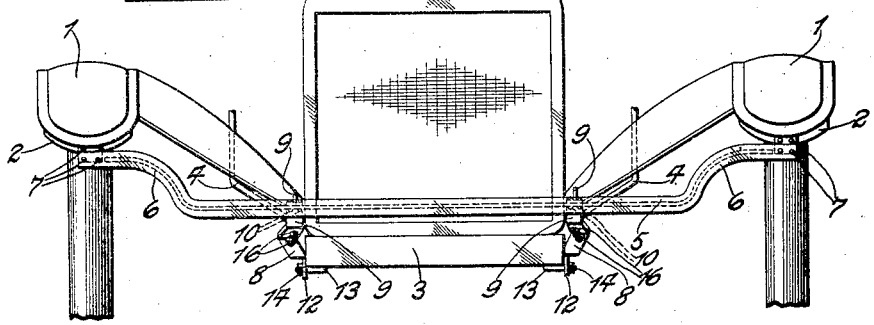
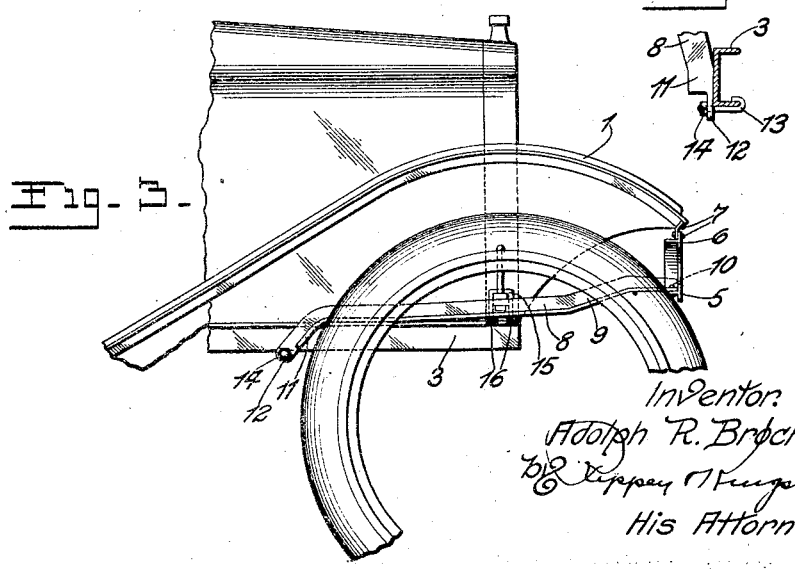
Inventor:
Adolph R. Brocksmith,
His Attorneys.

Patented Apr. 8, 1924.

1,489,480

UNITED STATES PATENT OFFICE.

ADOLPH R. BROCKSMITH, OF ST. LOUIS, MISSOURI.

BUMPER AND FENDER-BRACE CONSTRUCTION.

Application filed August 22, 1923. Serial No. 658,740.

*To all whom it may concern:*

Be it known that I, ADOLPH R. BROCK-SMITH, a citizen of the United States, residing at St. Louis, Missouri, have invented a new and useful Bumper and Fender-Brace Construction, of which the following is a specification.

This invention relates to improvements in bumper and fender brace construction, and consists in the novel structure hereinafter more fully disclosed.

An object of the invention is to provide a combined bumper and fender brace construction that may be readily applied to a motor vehicle without disturbing the standard assembly, and which braces the fenders laterally and longitudinally of the frame so as to give substantial rigidity thereto and at the same time provide a protecting structure for the parts of the motor vehicle.

Additional advantages of the construction will appear from the following detailed description thereof taken in connection with the accompanying drawing, in which—

Fig. 1 is a plan view of a front portion of a motor vehicle showing the structure of the invention applied thereto.

Fig. 2 is an end view showing the structure applied to a motor vehicle.

Fig. 3 is a side view of the same structure.

Fig. 4 is a sectional view taken on the line 4—4 of Fig. 1 showing the manner of connecting the longitudinal supporting arms to the frame of the vehicle.

In the embodiment of the invention illustrated in the drawing the device is shown as applied to a Ford motor vehicle and so much of the associated structure of the motor vehicle is shown as is necessary to illustrate the application of the device thereto. The motor vehicle parts 1 have fenders provided at their forward ends with depending flanges 2 constituting fender stiffeners. The longitudinal side members of the chassis are indicated by 3 and the lamp brackets of the vehicle are indicated by 4. As it is with these parts of the vehicle that the structure of the invention is associated, it is unnecessary to describe the further conventional showing of the other parts of the vehicle. The invention itself consists of a front bar 5 preferably formed from a T-iron, said bar being up-turned at the ends forming the curved sections 6. The formation of the bar permits the horizontal central section to lie on a plane substantially on a line with the upper part of the chassis of the vehicle and to lie adjacent to the ends of the fenders at the extremities.

Suitable fastening connections 7 are provided between the ends of the bar and the flanges 2 constituting the fender stiffeners. These connections rigidly couple the bar ends with the fenders preventing vibration of the fenders. Thus the bar 5—6 constitutes not only a fender support but also a bumper bar for protecting the front end of the vehicle against damage.

Supports for the bar 5—6 are provided in the form of arms 8 also preferably formed of T-iron, each of which has upwardly bent ends 9 connected directly to the web of the bar 5 by rivets 10 or other suitable connections. The rear ends of the arms 8 are downwardly bent forming sections 11. The arms 8 are spaced at either side of the chassis of the vehicle and extend rearwardly along the side members of the chassis.

In Fig. 4 the detailed form of connection is shown from which it will be observed that the rear ends of the arms are provided with ears 12 lying adjacent to the face of the side members of the chassis, and a hooked rod 13 extends through an opening in the ear 12, the hooked end of the rod engaging over the lower ledge of the U-shaped frame member and the other end of the rod extending through said opening to receive a nut 14 for connecting the rear ends of the bar 8 rigidly to the frame of the vehicle. This form of connection provides means for readily connecting the supporting arms at the rear with the frame of the vehicle, thereby holding the bar 5—6 against lateral or transverse vibration.

The central sections of the arms 8 extend along the sides of the chassis of the vehicle and beneath the lamp bracket arms. A clevis in the form of a U-shaped rod 15 seats over the lamp brackets, the ends of the rod extending through openings in the flange of the arms 8. The clevis is clamped in position by nuts 16 threaded over the ends of the clevis that project through the flange of the arms 8. This clevis connection holds the arms 8 rigidly in horizontal position and prevents vertical vibration of the arms 8 and thereby vertical vibration of the bar 5—6.

From the foregoing it will be readily appreciated that the device is simply designed so that it may be economically manufactured, and is arranged for convenient mounting on the vehicle. The whole device constitutes a rigid frame effective to prevent lateral or vertical vibration of the fenders and at the same time forms a bumper structure to prevent injury to the front of the vehicle.

I am aware that the structure may be modified without departing from the spirit and nature of the invention. I do not limit myself, therefore, to exact details shown, but what I claim and desire to secure by Letters Patent is:

1. In a vehicle including a pair of fenders, the combination of a transverse bar having upwardly and outwardly extended end portions rigidly secured to the fenders at each end, supporting arms rigidly connected with said bar between said end portions and extending rearwardly along the side members of the chassis of the vehicle and having downwardly extended portions at their rear ends, a coupling device for rigidly and detachably securing the downwardly extended portion of each of said arms to the side member of the chassis of the vehicle, and coupling devices connecting said arms intermediate their length with a rigid part of the frame of the vehicle.

2. In a vehicle provided with a pair of fenders and having chassis side members, the combination of a transverse bar having a horizontal portion and curved ends adapted to be mounted across the front of the vehicle, connections between the ends of said bar and the fenders, arms extending longitudinally at right angles from the bar and being rigidly connected therewith, a detachable connection for rigidly securing the rear end of each of said arms to the side member of the chassis of the vehicle, and clevis devices for coupling the arms intermediate of their length with a rigid portion of the frame of the vehicle.

3. In a motor vehicle equipped with a pair of fenders and a chassis having side members, a device comprising a bar arranged to extend transversely of the front of the vehicle between the fenders, connections between the fenders and the ends of said bar, arms extending at right angles to said bar and longitudinally of the vehicle, a hooked rod passing through the end of each of said arms and adapted to engage with the side members of the chassis constituting a clamp device for detachably connecting the ends of the arms rigidly with the frame of the vehicle, and U-shaped clevis devices arranged to engage with a rigid portion of the frame of the vehicle and to clamp said arms intermediate of their length to said rigid part of the vehicle whereby a rigid frame structure is provided preventing vertical and lateral vibration of the fenders and constituting a protective bumper for the front end of the vehicle.

4. In a motor vehicle equipped with a pair of fenders and a chassis having side members, a device comprising a bar T-shaped in cross section arranged to extend transversely of the front of the vehicle between the fenders, connections between the fenders and the ends of said bar, arms T-shaped in cross section extending at right angles to said bar and longitudinally of the vehicle, a hooked rod passing through the end of each of said arms and adapted to engage with the side members of the chassis constituting a clamp device for detachably connecting the ends of the arms rigidly with the frame of the vehicle, and a U-shaped clevis device arranged to engage with a rigid portion of the frame of the vehicle and to clamp said arms intermediate of their length to said rigid part of the vehicle whereby a rigid frame structure is provided preventing vertical and lateral vibration of the fenders and constituting a protective bumper for the front end of the vehicle.

5. In a motor vehicle equipped with a pair of fenders each of said fenders having a vertical flange at its front end and having a chassis with U-shaped side members and lamp brackets connected to the chassis of the vehicle, the combination of a transverse bar, connections between the ends of said transverse bar and the flanges of the fenders, arms extending from said bar at right angles and running longitudinally of the frame of the vehicle, clamping devices for clamping the rear ends of the arms to the U-shaped side members of the chassis, and a clevis device for clamping the arms intermediate of their length to said lamp brackets.

ADOLPH R. BROCKSMITH.